US012768195B2

(12) United States Patent
Almomani et al.

(10) Patent No.: US 12,768,195 B2
(45) Date of Patent: Oct. 20, 2026

(54) STRIKE PLATE WITH BOLT SENSING FEATURE

(71) Applicant: ASSA ABLOY Americas Residential Inc., New Haven, CT (US)

(72) Inventors: Nedal Almomani, Mission Viejo, CA (US); Chasen Beck, Costa Mesa, CA (US); Matthew Lovett, Mission Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 560 days.

(21) Appl. No.: 18/116,950

(22) Filed: Mar. 3, 2023

(65) Prior Publication Data

US 2023/0203841 A1 Jun. 29, 2023

Related U.S. Application Data

(62) Division of application No. 15/619,589, filed on Jun. 12, 2017, now abandoned.

(60) Provisional application No. 62/350,774, filed on Jun. 16, 2016.

(51) Int. Cl.
*E05B 15/02* (2006.01)
*E05B 47/00* (2006.01)

(52) U.S. Cl.
CPC .......... *E05B 15/0205* (2013.01); *E05B 47/00* (2013.01); *E05B 2047/0069* (2013.01)

(58) Field of Classification Search
None
See application file for complete search history.

(56) References Cited

U.S. PATENT DOCUMENTS 2,272,241 A 2/1942 Fendring
3,095,021 A 6/1963 Schlage et al.
3,803,575 A 4/1974 Gotanda
4,186,954 A 2/1980 Detlefs
4,550,939 A 11/1985 Babb, Jr. et al.
4,616,865 A 10/1986 Mackle
4,717,909 A 1/1988 Davis
4,904,005 A 2/1990 Frolov
5,029,912 A 7/1991 Gotanda
(Continued)

FOREIGN PATENT DOCUMENTS

CN 101798900 A * 8/2010 .......... G08B 25/008
DE 2813029 A1 9/1979
(Continued)

OTHER PUBLICATIONS

Computer Generated Translation for DE102013106220A1, Generated on Sep. 4, 2025, https://worldwide.espacenet.com/patent/ (Year: 2025).*

(Continued)

*Primary Examiner* — Alyson M Merlino
(74) *Attorney, Agent, or Firm* — Merchant & Gould P.C.

(57) ABSTRACT

A sensor assembly includes a sensor located within an opening formed in a strike box of the strike assembly. The sensor, which could be an optical, mechanical, continuity, inductive, ultrasonic, and/or mechanical sensor, is configured to detect whether the bolt of the bolt assembly is encompassed by the strike box. The sensor assembly is configured to interact with a surface of the bolt when the bolt is located within the opening.

15 Claims, 10 Drawing Sheets

(56) References Cited

U.S. PATENT DOCUMENTS

| | | | | |
|---|---|---|---|---|
| 5,511,832 | A * | 4/1996 | Kunzel | E05B 63/0017 292/144 |
| 6,359,538 | B1 | 3/2002 | Jolley et al. | |
| D461,700 | S | 8/2002 | Meredith | |
| 6,568,726 | B1 | 5/2003 | Caspi et al. | |
| 6,825,752 | B2 * | 11/2004 | Nahata | E05B 81/78 340/545.4 |
| 7,151,449 | B2 * | 12/2006 | Meijer | E05B 45/083 340/542 |
| 7,158,029 | B1 | 1/2007 | Martyn | |
| 7,654,147 | B2 * | 2/2010 | Witte | E05B 81/78 73/781 |
| 7,941,934 | B2 * | 5/2011 | Gerner | E05B 47/063 340/5.61 |
| 8,558,561 | B2 * | 10/2013 | Sage | H03K 17/9622 345/173 |
| 8,814,233 | B2 * | 8/2014 | Leska | F16P 3/10 292/144 |
| 9,353,550 | B1 | 5/2016 | Smith, III | |
| 2004/0100254 | A1 | 5/2004 | Viitanen | |
| 2005/0044908 | A1 | 3/2005 | Min | |
| 2007/0204662 | A1 | 9/2007 | Pullmann et al. | |
| 2008/0012359 | A1 | 1/2008 | Aschieri | |
| 2008/0012705 | A1 | 1/2008 | Outzs | |
| 2009/0066220 | A1 * | 3/2009 | Handa | H10K 50/854 313/506 |
| 2009/0066320 | A1 | 3/2009 | Posey | |
| 2010/0313480 | A1 * | 12/2010 | Verreault | E05F 15/40 49/358 |
| 2010/0313612 | A1 * | 12/2010 | Eichenstein | E05B 15/0205 70/432 |
| 2012/0167646 | A1 | 7/2012 | Sharma et al. | |
| 2012/0299314 | A1 * | 11/2012 | Jiang | E05B 45/083 292/137 |
| 2015/0159401 | A1 * | 6/2015 | Patrick | G07C 9/00571 292/137 |
| 2017/0038005 | A1 | 2/2017 | Kraus et al. | |
| 2017/0044797 | A1 | 2/2017 | Colman et al. | |
| 2017/0051530 | A1 | 2/2017 | Colman et al. | |
| 2017/0362856 | A1 | 12/2017 | Almomani | |

FOREIGN PATENT DOCUMENTS

| | | | | |
|---|---|---|---|---|
| DE | 4232809 | A1 | 5/1992 | |
| DE | 102013106220 | A1 * | 12/2014 | E05B 65/005 |
| TW | 201341640 | A | 10/2013 | |
| WO | WO-2011019406 | A2 * | 2/2011 | E05B 41/00 |
| WO | 2013/067091 | | 5/2013 | |

OTHER PUBLICATIONS

Lark-Wl, "BlueGuard—E World's Safest Smart Lock for Everyone", https://www.kickstarter.com/projects/662403304/blueguarde-e-worlds-safest-smart-lock-for-everyone?token=3db0544a: Dec. 8, 2015, 21 pages.

PCT International Search Report and Written Opinion in International Application PCT/US2017/037363, mailed Sep. 8, 2017, 14 pages.

PCT International Preliminary Report on Patentability in International Application PCT/US2017/037363, mailed Dec. 27, 2018, 13 pages.

* cited by examiner

STRIKE PLATE WITH BOLT SENSING FEATURE

RELATED APPLICATIONS

This application is a divisional application of U.S. patent application Ser. No. 15/619,589, filed Jun. 12, 2017, which claims the benefit of U.S. Provisional Application Ser. No. 62/350,774, filed Jun. 16, 2016, the complete disclosures of which are hereby incorporated by reference in their entirety.

TECHNICAL FIELD

The present disclosure relates generally to sensors for doors; in particular, this disclosure relates to sensors for detecting whether a door is fully latched.

BACKGROUND AND SUMMARY

Security systems are in widespread use in residential and commercial markets. These devices control ingress through doors to secured areas, such as a building or other secured space, by requiring certain authorized credentials. Existing security systems may include a sensor for determining whether a door is open or closed. In various embodiments of such systems, such a sensor may be located within the electronic latch mechanism in the door to determine if the bolt of the latch mechanism is retracted or extended. However, existing sensors are not able to provide exact location information regarding the bolt to determine whether the bolt is secured within a strike box of the door frame to ensure the door is closed. Further, existing sensors cannot determine whether a door is merely slightly ajar with the bolt extended or closed with the bolt secured within the strike box. Moreover, installation of existing sensors can be time consuming and aesthetically unpleasing. As one example, installers may be forced to separately install a magnet to a door and a magnetic sensor to molding surrounding the door (or vice versa) to determine orientation of the door to the door frame. Although such sensors are available in different colors to try to blend in with the door and molding colors, it can still have an unsightly appearance.

According to one aspect, this disclosure provides a sensor assembly that includes a sensor located within an opening formed in a strike box of the strike assembly. The sensor, which could be an optical, mechanical, continuity, inductive, ultrasonic, and/or mechanical sensor, is configured to detect whether the bolt of the bolt assembly is encompassed by the strike box. The sensor assembly is configured to interact with a surface of the bolt when the bolt is located within the opening.

BRIEF DESCRIPTION OF THE FIGURES

The detailed description makes references to the accompanying figures in which.

Figure 1:
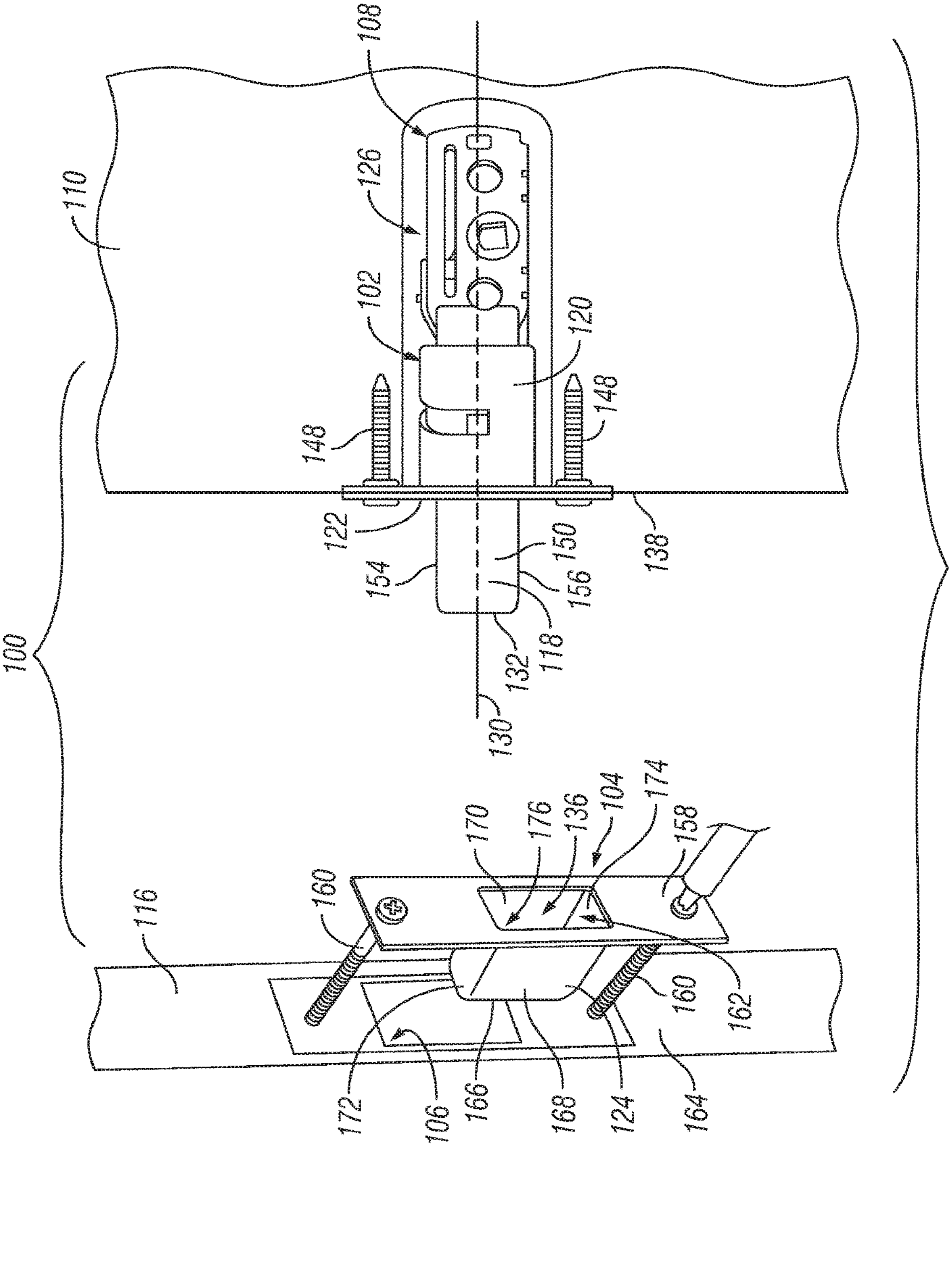
FIG. 1 is a side view of a latch assembly in accordance with an embodiment of the present invention to be installed in a door and door jamb.

Corresponding reference characters indicate corresponding parts throughout the several views. The components in the figures are not necessarily to scale, emphasis instead being placed upon illustrating the principals and functions of the invention. The exemplification set out herein illustrates embodiments of the invention, and such exemplification is not to be construed as limiting the scope of the invention in any manner.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure, Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein.

In the drawings, some structural features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
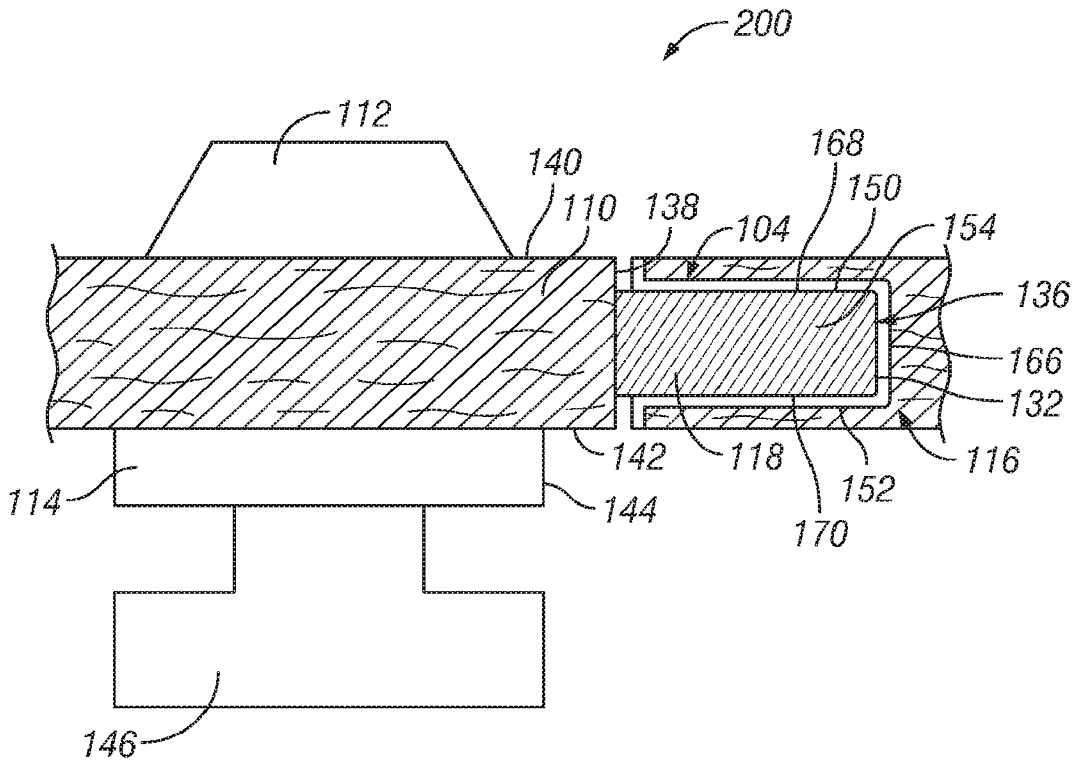
FIG. 2 is a cross-sectional view of a lock assembly in accordance with an embodiment of the present disclosure, illustrating the latch assembly of FIG. 1 installed in a door and a door jamb.

FIGS. 1 and 2 illustrate various views of a latch assembly 100 according to one embodiment of the disclosure. The term "latch assembly" is broadly intended to encompass a latch mechanism of any electronic, electro-mechanical, or mechanical lock assemblies that utilize a bolt that is movable between a locked engaged with a strike box (or strike plate) and an unlocked position outside of the strike box (or strike plate) via electronical and/or mechanical force. It should be appreciated, however, that the present disclosure applies to any type of lock assembly that utilizes a bolt received within a strike box (or strike plate) and is not restricted to the specific embodiments described herein.

As illustrated in FIGS. 1 and 2, in a typical lock assembly 200, the lock assembly 200 may include an exterior assembly 112, the latch assembly 100, and an interior assembly 114. Typically, the exterior assembly 112 is mounted on the outside of a door 110, while the interior assembly 114 is mounted inside the door 110. The latch assembly 100 is configured to be located between the exterior and interior assemblies 112 and 114 and may be partially mounted in a bore 108 formed in the door 110. The term "outside" is broadly used to mean an area outside a door and "inside" is also broadly used to denote an area inside a door. With an exterior entry door, for example, the exterior assembly may be mounted outside a building, while the interior assembly may be mounted inside the building. With an interior door, the exterior assembly may be mounted inside a building, but outside a room secured by the lock assembly, while the interior assembly may be mounted in the secured room.

In illustrative embodiments, the latch assembly 100 is configured to be operated by the interior and/or exterior assemblies 112 and 114 to latch or unlatch the door from a surrounding door frame/jamb 116 to restrict or permit access through the door frame 116. In various embodiments, for example, the interior assembly 114 includes an interior cover 144 that houses internal components (not shown) of the internal assembly 114 which interact with the latch assembly 100 to operate the latch assembly 100. Alternatively, the exterior assembly 112 may include components (not shown) which interact with the latch assembly 100 to operate the latch assembly 100. As another embodiment, both the internal and external assemblies 112 and 114 can be configured with components to operate the latch assembly 100.

As illustrated in FIG. 1, the latch assembly 100 generally comprises a bolt assembly 102 and a strike assembly 104. The bolt assembly 102 is disposed substantially in the core 108 in the door 110, and may be actuated manually via the internal or external assemblies 112 and 114 by a mechanical lock assembly, or electronically using, for example, a keypad, to extend and retract a bolt 118 of the bolt assembly 102. In illustrative embodiments, for example, a turnpiece 146 of the interior assembly 114 may be rotated by a user to manually extend and retract the bolt 118. The strike assembly 104 is disposed substantially in a core 106 in the door frame 116 of the door and is configured to receive the bolt 118 of the bolt assembly 102 within a strike box 124 of the strike assembly 104 when the door 110 is aligned with the door frame 116. By containing the bolt 118 within the strike box 124, the door 110 may be blocked or prevented from moving out of alignment with the door frame 116, effectively latching the door 110 in a closed position.

In illustrative embodiments, the bolt assembly 102 comprises the bolt 118, a sleeve 120, a base plate 122, and a bolt-driving mechanism 126. The bolt 118 may be connected to the sleeve 120 and the bolt-driving mechanism 126 such that the bolt-retracting mechanism 126 can operate to extend or retract the bolt 118 within the sleeve 120, For example, the bolt 118 may be configured to move linearly in and out of the sleeve 120 of the bolt assembly 102 along an extension axis 130 when the bolt-driving mechanism 126 is actuated (via the interior or exterior assemblies 112 and 114, for example) to retract the bolt 118. Various forms of boll-retracting mechanisms are known in the art and considered within the scope of this disclosure. The sleeve 120 may be fixedly coupled to the base plate 122 to permit the bolt assembly 102 to be secured to the door 110. For example, as is typical, the bolt assembly 102 may be located within the core 108 of the door 110 and further attached to at least a connecting edge 138 of the door 110 that e ds between an exterior edge 140 (FIG. 2) of the door 110 and an interior edge 142 (FIG. 2) of the door 110. The base plate 122 may be secured to be flush against the connecting edge 138 of the door 110 (via, for example, connecting screws 148) so that the sleeve 120 and bolt-retracting mechanism 126 are contained within the core 108 of the door 110.

The bolt 118 may be configured of various dimensions that can be received within the strike box 124. In illustrative embodiments, the bolt 118 could generally be rectangular in cross-section and includes at least a first end 132, a first side 150, a second side 152, a top surface 154, and a bottom surface 156. When the bolt 118 is retracted within the sleeve 120, the first end 132 of the bolt 118 is generally flush with the base plate 122. When the bolt 118 is extended, the bolt 118 protrudes through an edge bore 134 in the door 110 into the strike box 124, which is positioned in the jamb 116 adjacent the door 110, in order to secure the door 110 to the jamb 116.

As illustrated in FIGS. 1 and 2, the strike assembly 104 may comprise the strike box 124, an opening 136 formed by the strike box 124, and a base plate 158. The strike box 124 may be fixedly connected to the base plate 158, and the base plate 158 is formed to include an aperture 162 that permits access to the opening 136 of the strike box 124 form an exterior of the strike assembly104. As is typical, the strike assembly 104 is attached to the jamb 116 using fasteners 160 that extend through the base plate 158 so that the base plate 158 is Dash with a surface 164 of the jamb 116. When the base plate 158 is connected to the jamb 116, the strike box 124 is configured to be contained within the core 106 formed in the jamb 116.

The strike box 124 may be configured of various dimensions such that the opening 136 can receive the bolt 118 of the bolt assembly 102. In illustrative embodiments, the strike box 124 is generally rectangular in cross-section and includes a back panel 166, a first side panel 168, a second side panel 170, a top panel 172, and a bottom panel 174, and is formed to include an aperture 176 that is positioned opposite the back panel 166 and configured to align with the aperture 162 of the base plate 158 to permit access to the opening 136 of the strike box 124. The opening 136 is defined by the connection of the back panel 166, first side panel 168, second side panel 170, top panel 172 and bottom panel 174. Under desired conditions, when the bolt 118 is extended into the strike box 124, the bolt 118 is surrounded by the panels 166, 168, 170, 172 and 174, and at least the first and second side panels 168 and 170 block movement of the bolt 118 out of the strike box 124 in order to secure the door 110 to the jamb 116. In various embodiments, as illustrated in FIGS. 3-17, the top surface 154 of the bolt 118 may be slightly spaced apart from the top panel 172 of the strike box, and the bottom surface 156 of the bolt 118 may be slightly spaced apart from the bottom panel 174 of the strike box 124, when the bolt 118 is received within the opening 136 of the strike box 124. Similarly, the back panel 166 of strike box 124 may be slightly spaced apart from the first end 132 of the bolt 118 when the bolt 118 is received within the opening 136.

In illustrative embodiments, the latch assembly 100 includes a sensor assembly 180 that is configured to detect whether the bolt 118 is located in the opening 136 of the strike box 124 a sufficient distance as to securely latch the door 110 to the jamb 116 in a closed position. In various embodiments, the sensor assembly 180 may be at least partially coupled to the strike assembly 104 to interact with the bolt 118 as it is received within the opening 136. The sensor assembly 180 may alternatively be coupled to another part of the latch assembly 100 to detect if the bolt 118 has entered the opening 136 of the strike box 124.

Various embodiments of the sensor assembly 180 will now be described herein. The various embodiments are provided to illustrate how the sensor assembly 180 can work in conjunction with the strike assembly 104 and/or bolt 118 to detect that the bolt 118 is adequately contained within the strike box 124 of the strike assembly 104 or not, and are not intended to limit the scope of the sensor assembly 180. It is within the scope of this disclosure for the determination of the amount of the bolt 118 that is required to be considered adequately secured may be performed during set up or installation, or may be mechanically configured by other factors. It is also within the scope of this disclosure that the sensor assembly 180 may be configured to have multiple sensing components that can determine the depth of the bolt 118 within the strike box 104, and also determine travel direction of the bolt 118. Other measurements and determinable characteristics of the bolt 118 as it travels into the strike box 104 will be understood to one of ordinary skill in the art.

Figure 3:
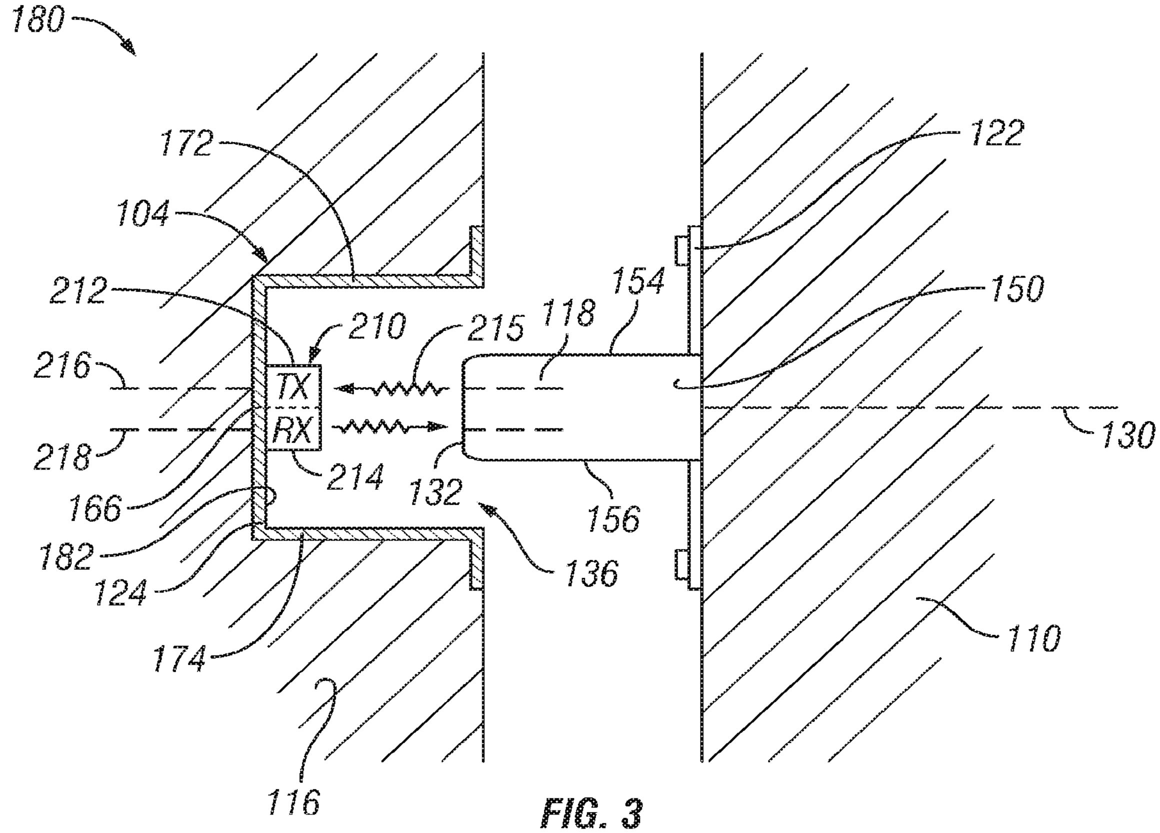
FIGS. 3-17 are cross-sectional views of various embodiments of a sensor assembly to be used with the latch assembly of FIG. 1.

In a first illustrative embodiment of the sensor assembly 180, an optical sensor 210 may be located along an inside surface 182 of the back panel 166 of the strike box 124, as illustrated in FIG. 3. The optical sensor 210 includes a transmission (TX) portion 212 and a receiver (RX) portion 214, with the TX portion 212 configured to transmit or send an optical signal 215 along a TX axis 216 that is substantially parallel with the extension axis 130 of the bolt 118, the TX axis 216 configured to intersect a portion of the first end 132 of the bolt 118 when the bolt 118 enters the strike box 124. The signal 215 is configured to be reflected off of the first end 132 of the bolt 118 when the bolt 118 is received within the strike box 124 such that the signal will reflect off of the bolt 118 and back toward the back panel 166 of the strike box 124 along a RX axis 218. In such an embodiment, the RX portion 214 is configured to be aligned with the RX axis 218 to receive the signal 215 after it has bounced off of the first end 132 of the bolt 118. The RX portion 214 of the optical sensor 210 is configured to detect the strength of the reflection of the signal 215 after it has bounced off of the first end 132. When the bolt. 118 is located at a predetermined distance from the sensor 210 that corresponds with the bolt 118 being secured within the strike box 124, the signal 215 will have a determinable reflection strength. The sensor assembly 180 can accordingly detect when the bolt 118 is located within the strike box 124 by analyzing the reflection strength of the signal 215 via the RX portion 214 of the sensor. If the bolt 118 is not located within the strike box 124 or located within a predetermined distance of the TX portion 212 that can receive/deflect the signal 215, then the signal 215 will not be returned to the RX portion 214 and the sensor assembly 180 will then indicate that the bolt 118 is not located within the strike box 124, i.e., the door 110 is not completely latched closed.

In a second illustrative embodiment of the sensor assembly 180, the optical sensor 210 may operate in a similar manner as the first illustrative embodiment and as illustrated in FIG. 3, except the sensor assembly 180 has the ability to track the time from transmission of the signal 215 by the TX portion 212 to receipt of the signal 215 by the RX portion 214. In this manner, when the bolt 118 is located at a predetermined distance from the sensor 210 that corresponds with the bolt 118 being secured within the strike box 124, there will be a predetermined length of time for the signal to travel from the TX portion 212 to the RX portion 214. The sensor assembly 180 can accordingly detect when the bolt 118 is located within the strike box 124 by analyzing whether the time between sending signal 215 from the TX portion 212 to the RX portion 214 meets the predetermined length of time. If the bolt 118 is not located within the strike box 124 or located within a predetermined distance of the TX portion 212 that can receive/deflect the signal 215, then the signal 215 will not be returned to the RX portion 214 and there will be no end time registered by the RX portion 214. Accordingly, the sensor assembly 180 will then indicate that the bolt 118 is not located within the strike box 124, i.e., the door 110 is not completely latched closed.

Figure 4:
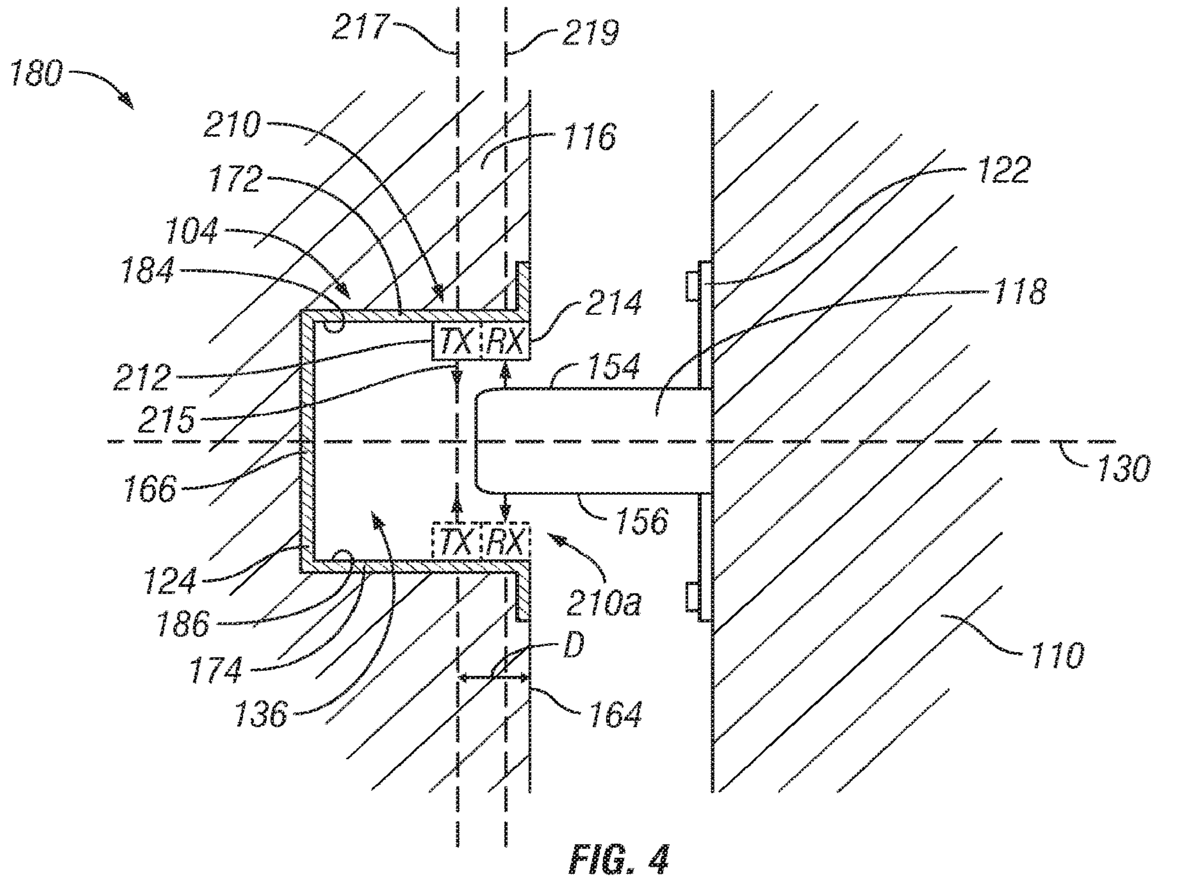

In a third illustrative embodiment of the sensor assembly 180, the optical sensor 210 may operate in a similar manner as the first embodiment, except that the sensor assembly 180 may be located along an inside surface 184 of the top panel 172, as illustrated in FIG. 4. The TX portion 212 of the optical sensor 210 is configured to transmit or send the optical signal 215 along a TX axis 217 that is substantially perpendicular to the extension axis 130 of the bolt 118, the TX axis 217 configured to intersect the top surface 154 of the bolt 118 when the bolt 118 extends a predetermined distance D into the strike box 124 from the surface 164 of the jamb 116, wherein the distance D can represent the amount of distance that the bolt 118 must travel past the surface 164 and into the opening 136 of the strike box 124 to be securely retained within the strike box 124. The signal 215 is configured to be reflected off of the top surface 154 of the bolt 118 when the bolt 118 is received within the strike box 124 such that the signal will reflect off of the bolt 118 and back toward the top panel 172 of the strike box 124 along an RX axis 219. In such an embodiment, the RX portion 214 is configured to be aligned with the RX axis 219 to receive the signal 215 after it has bounced off of the top surface 154 of the bolt 118. If the sensor assembly 180 detects the bolt 118 is located within the strike box 124 by analyzing whether the RX portion 214 has received the signal 215, then the sensor assembly 180 can indicate that the door 110 is adequately latched closed. In an alternative to this embodiment, an optical sensor **210*a* may be alternatively positioned along an inside surface 186 of the bottom panel 174 of the strike box 124 that can send a signal 215 to deflect off the bottom surface 156 of the bolt 118. Alternatively, the sensor assembly 180 may include both a first optical sensor 210 and a second optical sensor 210*a***.

In a fourth illustrative embodiment of the sensor assembly 180, the optical sensor 210 may operate in a similar manner as the third illustrative embodiment and as illustrated in FIG. 4, except the sensor assembly 180 has the ability to track the time from transmission of the signal 215 by the TX portion 212 to receipt of the signal 215 by the RX portion 214, similar to the second illustrative embodiment. In this manner, when the bolt 118 is located in the strike box 124 and intersects TX axis 216, there will be a predetermined length of time for the signal to travel from the TX portion 212 to the RX portion 214. The sensor assembly 180 can accordingly detect when the bolt 118 is secured within the strike box 124 by analyzing whether the time between sending signal 215 from the TX portion 212 to the RX portion 214 the reflection strength of the signal 215 via the RX portion 214 of the sensor. If the bolt 118 is not secured within the strike box 124 or located within a predetermined distance of the TX portion 212 that can receive/deflect the signal 215, then the signal 215 will not be returned to the RX portion 214 and there will be no end time registered by the RX portion 214.

Figure 5:
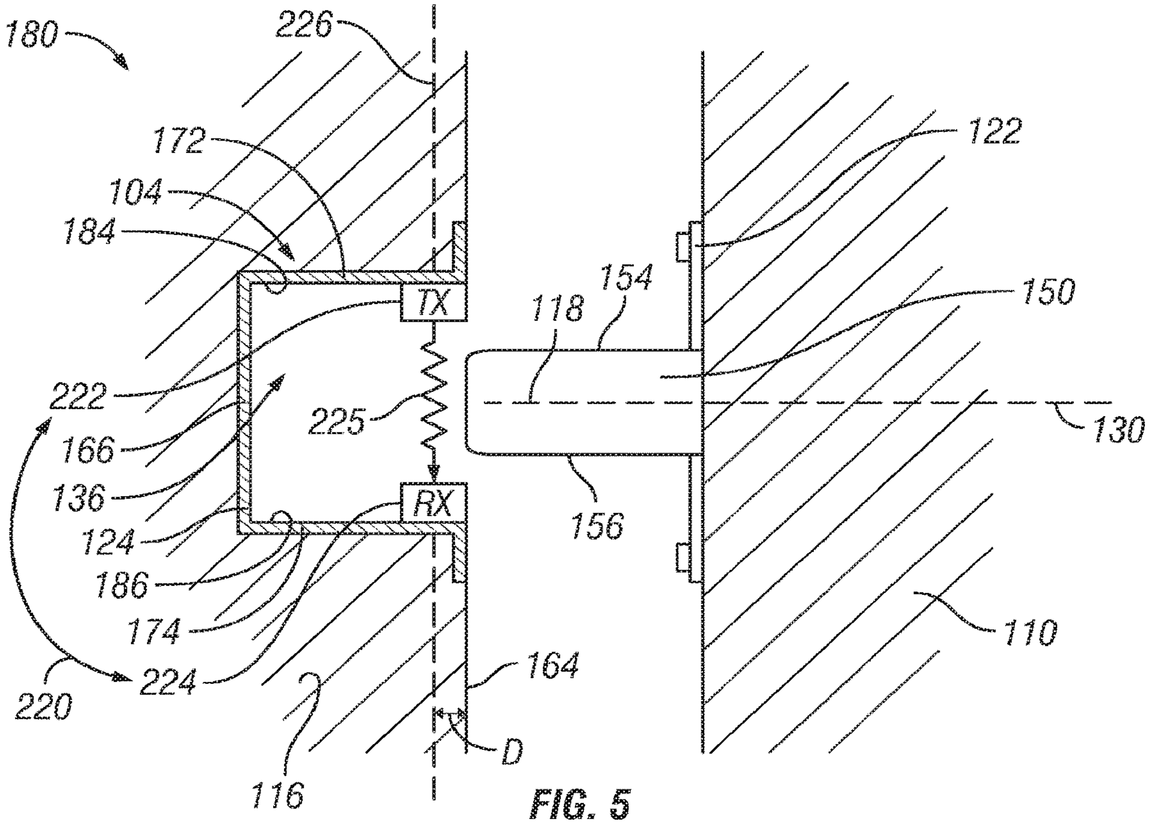

In a fifth illustrative embodiment of the sensor assembly 180, an optical sensor 220 may be located along both an inside surface 184 of the top panel 172 and an inside surface 186 of the bottom panel 174 of the strike box 124, as illustrated in FIG. 5. The optical sensor 220 includes a transmission (TX) portion 222 and a receiver (RX) portion 224, with the TX portion 222 configured to transmit or send an optical signal 225 along a beam axis 226 that intersects the RX portion 224. The TX portion 222 may be configured to transmit the optical signal 225 continuously, or a predetermined time intervals, to the RX portion 224. As illustrated in FIG. 5, the beam axis 226 may be substantially perpendicular to the extension axis 130 of the bolt 118, although other alignments of the beam axis 226 and the extension axis 130 are envisioned herein. The beam axis 226 is configured to be at least a predetermined distance D from the surface 164 of the jamb 116, wherein the distance D can represent the amount of distance that the bolt 118 must travel past the surface 164 and into the opening 136 of the strike box 124 to be securely retained within the strike box 124. As the bolt 118 is received within the strike box 124, the top surface 154 and/or the bottom surface 156 of the bolt 118 will intersect the beam axis 226, breaking the signal 225 from the TX portion 222 to the RX portion 224, Accordingly, when the RX portion 224 of the optical sensor 210 fails to detect the signal 225, the sensor assembly 180 can identify that the bolt 118 is located within the strike box 124, i.e., the door is latched closed. Otherwise, the sensor assembly 180 detects that the door is not fully latched closed.

Figure 6:
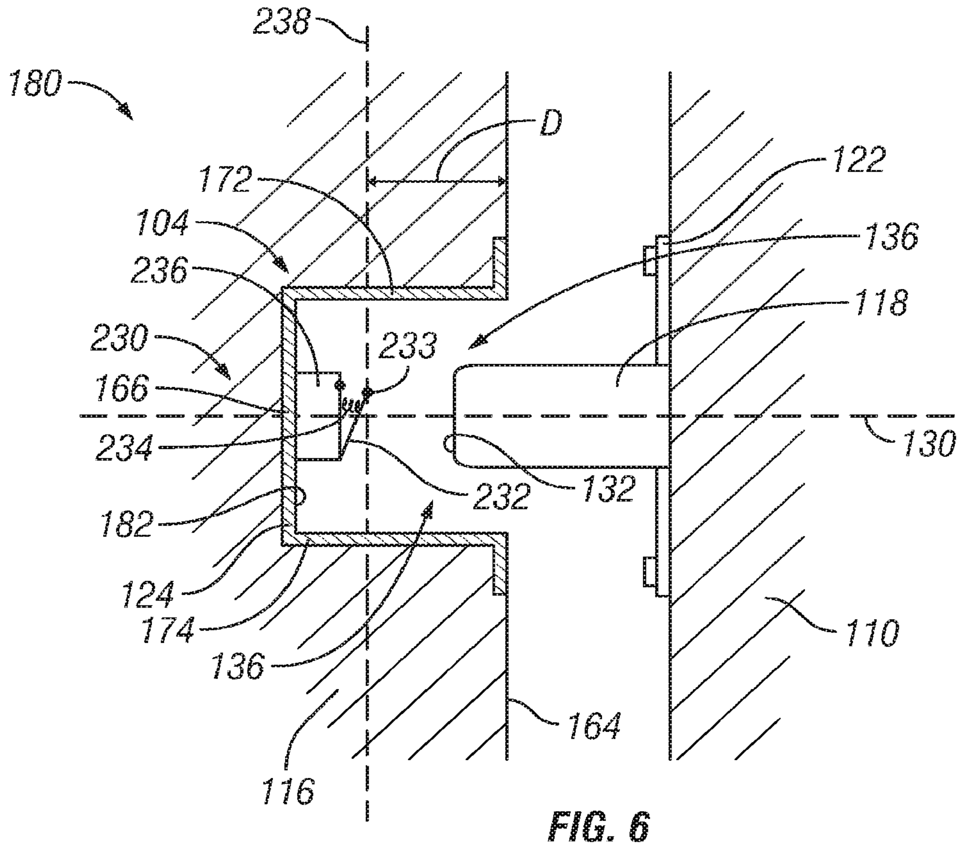

In a sixth illustrative embodiment of the sensor assembly 180, a mechanical sensor 230 may be located along an inside surface 182 of the back panel 166 of the strike box 124, as illustrated in FIG. 6. The mechanical sensor 230 may be comprised of a movable switch 232, a biasing member 234, and an optional base 236 upon which the switch 232 is hinged or pivoted for movement. The mechanical sensor 230 is mounted upon the back panel 166 in such a way that the switch 232 extends within the opening 136 such that a portion (such as an end 233) of the switch 232 intersects with the extension axis 130 of the bolt 118. The switch 232 is biased away from the back panel 166 by the biasing member 234 toward the aperture 162 of the strike box 124. The switch 232 is configured to be pushed toward the back panel 166 when the first end 132 of the bolt 118 abuts against the switch 232 as the bolt enters the strike box 124. The switch 232 may be located along an actuation axis 238 that is generally perpendicular to the extension axis 130, and the actuation axis 238 may be located a predetermined distance D from the surface 164 of the jamb 116 that corresponds with the bolt 118 being secured within the strike box 124. When the first end 132 of the bolt 118 is located at the predetermined distance D from the surface 164, it will biases the switch 232 toward the back panel 166 against the biasing member 234. The sensor assembly 180 then detects that the bolt 118 is located within the strike box 124 and the door 110 is latched. If the bolt 118 is not located within the strike box 124 or located within the predetermined distance D of the switch 232 to bias the switch 232 toward the back panel 166, then the sensor assembly 180 will then indicate that the bolt 118 is not located within the strike box 124, i.e., the door 110 is not completely latched closed.

Figure 7:
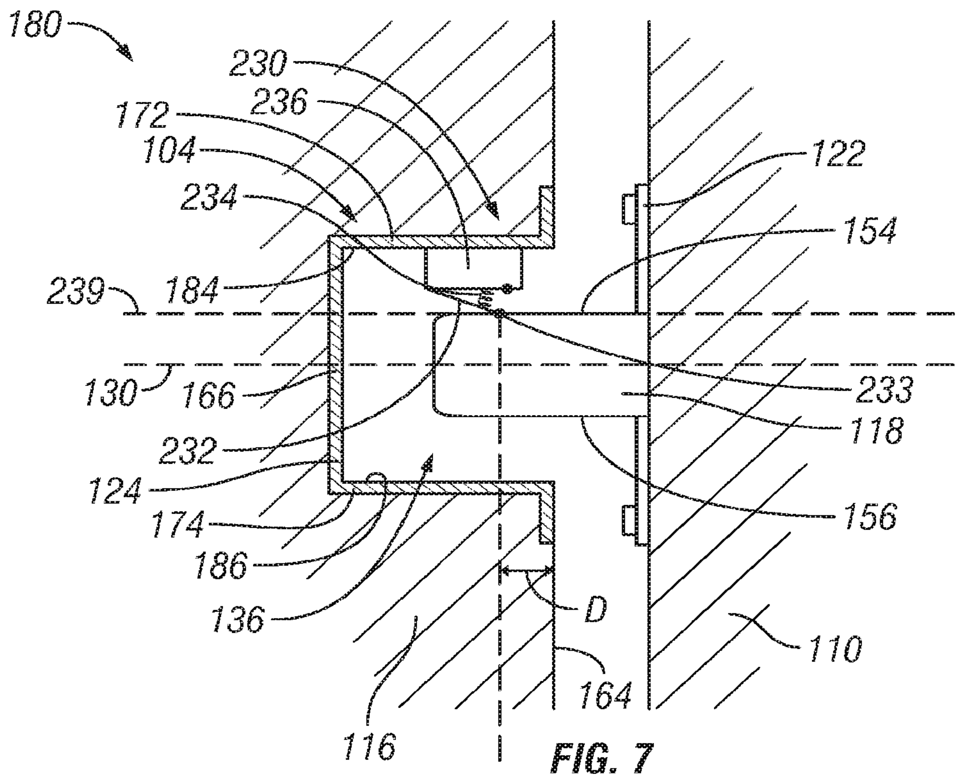

In a seventh illustrative embodiment of the sensor assembly 180, the sensor assembly 180 may operate in a similar manner as the sixth embodiment, except that the sensor assembly 180 may be located along an inside surface 184 of the top panel 172, as illustrated in FIG. 7. The switch 232 is biased away from the top panel 172 by the biasing member 234 toward the bottom panel 174 of the strike box 124. The mechanical sensor 230 is mounted upon the back panel 166 in such a way that the switch 232 extends within the opening 136 such that the end 233 of the switch 232 is positioned along an intersection axis 239 of the top surface 154 bolt 118 when switch 232 is in a natural state that is biased way from the top panel 172 by the biasing member 234. The intersection axis 239 is generally parallel to the extension axis 130. The end 233 of the switch 232 is also positioned a predetermined distance D from the surface 164 of the jamb 116 that corresponds with the bolt 118 being secured within the strike box 124. When the bolt 118 is moved within the strike box 124 the predetermined distance D, the top surface 154 of the bolt 118 will abut against the end 233 of the switch 232 and move the switch upward toward the top panel 172. The sensor assembly 180 then detects that the bolt 118 is located within the strike box 124 and the door 110 is latched. If the bolt 118 is not located within the strike box 124 or located within the predetermined distance D of the switch 232 to bias the switch 232 toward the top panel 172, then the sensor assembly 180 will then indicate that the bolt 118 is not located within the strike box 124, i.e., the door 110 is not completely latched closed. As an alternative or in conjunction with this illustrative embodiment, the sensor assembly 180 may comprise a mechanical sensor positioned along the inside surface 186 of the bottom panel 174 of the strike box 124 in order to intersect the bottom surface 156 of the bolt 118.

Figure 8:
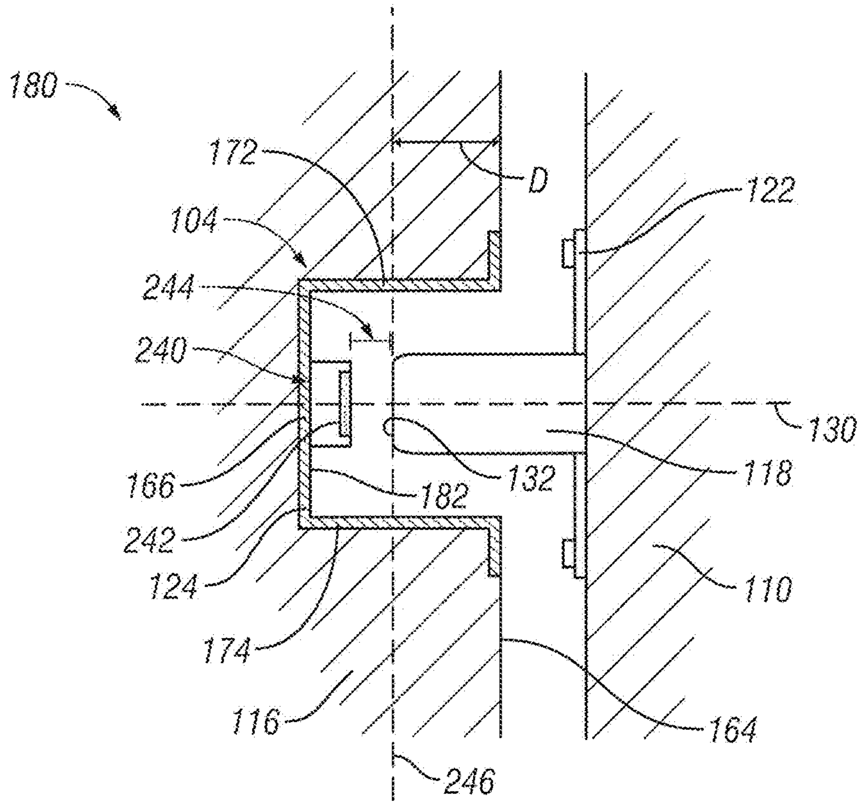

In an eighth illustrative embodiment of the sensor assembly 180, a capacitive sensor 240 may be located along an inside surface 182 of the back panel 166 of the strike box 124, as illustrated in FIG. 8. The capacitive sensor 240 includes one or more capacitive sensor elements 242 that are configured to emit an electrical field 244 within the opening 136 of the strike box 124. The sensor assembly 180 is configured to detect changes in the electrical filed 244 generated by the capacitive sensor 240. The capacitive sensor element 242 is located to be substantially aligned with the extension axis 130 of the bolt 118 when the bolt 118 enters the strike box 124. As the first end. 132 of the bolt 118 extends within the opening 136, it will replace the dielectric constant of air, as is generally known. The capacitive sensor element 242 can be configured to create an electrical field 244 that generally extends to an actuation axis 246, the actuation axis generally extending a predetermined distance D from the surface 164 of the jamb 116 that corresponds with the bolt 118 being secured within the strike box 124. When the bolt 118 is moved within the strike box 124 the predetermined distance D, the electrical field 244 is changed and the capacitive sensor 240 can detect the change, for instance, an increase in the capacitance sensed. When a pre-determined capacitive threshold is reached within the electrical field 244, the sensor assembly 180 will register that the bolt 118 is secured within the strike box 124. If the bolt 118 is not located within the strike box 124 or located within a predetermined distance D to alter the electrical field 244, then the sensor assembly 180 will then indicate that the bolt 118 is not located within the strike box 124, i.e., the door 110 is not completely latched closed.

Figure 9:
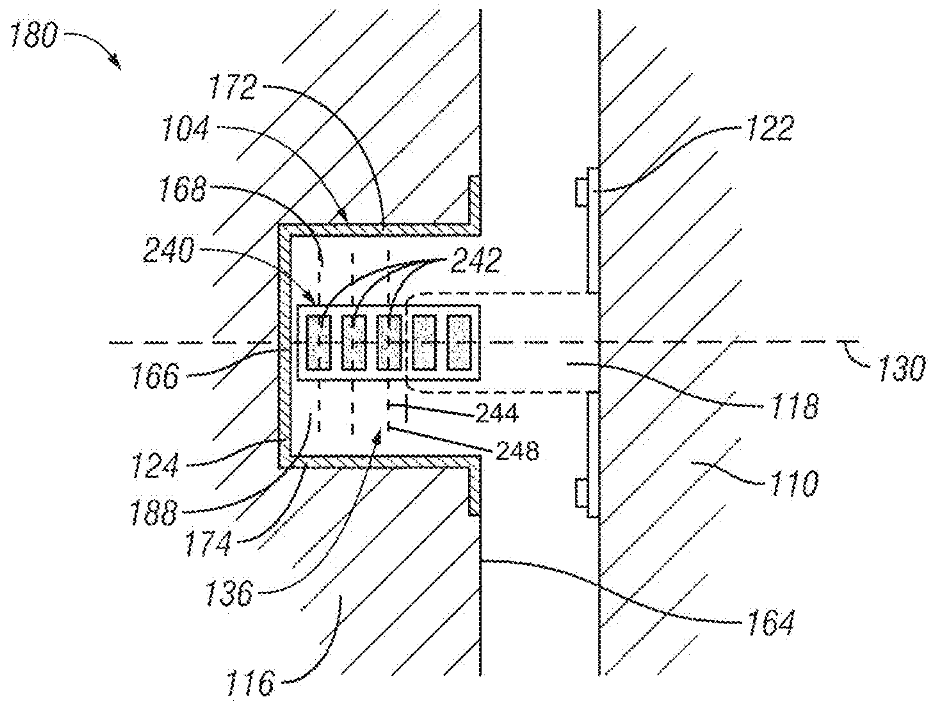

In a ninth illustrative embodiment of the sensor assembly 180, the sensor assembly 180 may operate in a similar manner as the seventh embodiment, except that the sensor assembly 180 may be located along an inside surface 188 of the first side panel 168 of the strike box 124, as illustrated in FIG. 9. The capacitive sensor 240 includes one or more capacitive sensor elements 242 that are configured to emit an electrical field 244 within the opening 136 of the strike box 124. The capacitive sensor elements 242 are aligned along a measurement plane/axis 248 that is generally perpendicular to the extension axis 130 of the bolt 118 when it is received within the strike box 124. As in the previous embodiment, the bolt 118 will saturate or change the electrical field 244 as it comes within a predetermined distance of the field 244, and the capacitive sensor element 242 generating the electrical field 244 will be able to detect such change. In various embodiments, the capacitive sensor elements 242 may be positioned to be a predetermined distance D from the surface 164 of the jamb 116 that corresponds with the bolt 118 being secured within the strike box 124. Alternatively, the capacitive sensor elements 242 may be positioned along length of the first side panel 168 to detect as the bolt 118 is inserted into the opening 136, and the sensor assembly 180 may have a pre-determined threshold of saturation across all of the capacitive sensor elements 242 (or a pre-determined order of saturating each of the individual sensor elements 242) that determines whether the bolt 118 is located sufficiently within the opening 136 of the strike box 124 to secure the bolt 118 and ensure the door 110 is latched sufficiently. It is further envisioned that the capacitive sensor 240 may be positioned along the second side panel 170, the top panel 172, or the bottom panel 174 of the strike box 124, or multiple capacitive sensors 240 may be positioned on one or more of these panels, within the scope of this disclosure.

Figure 10:
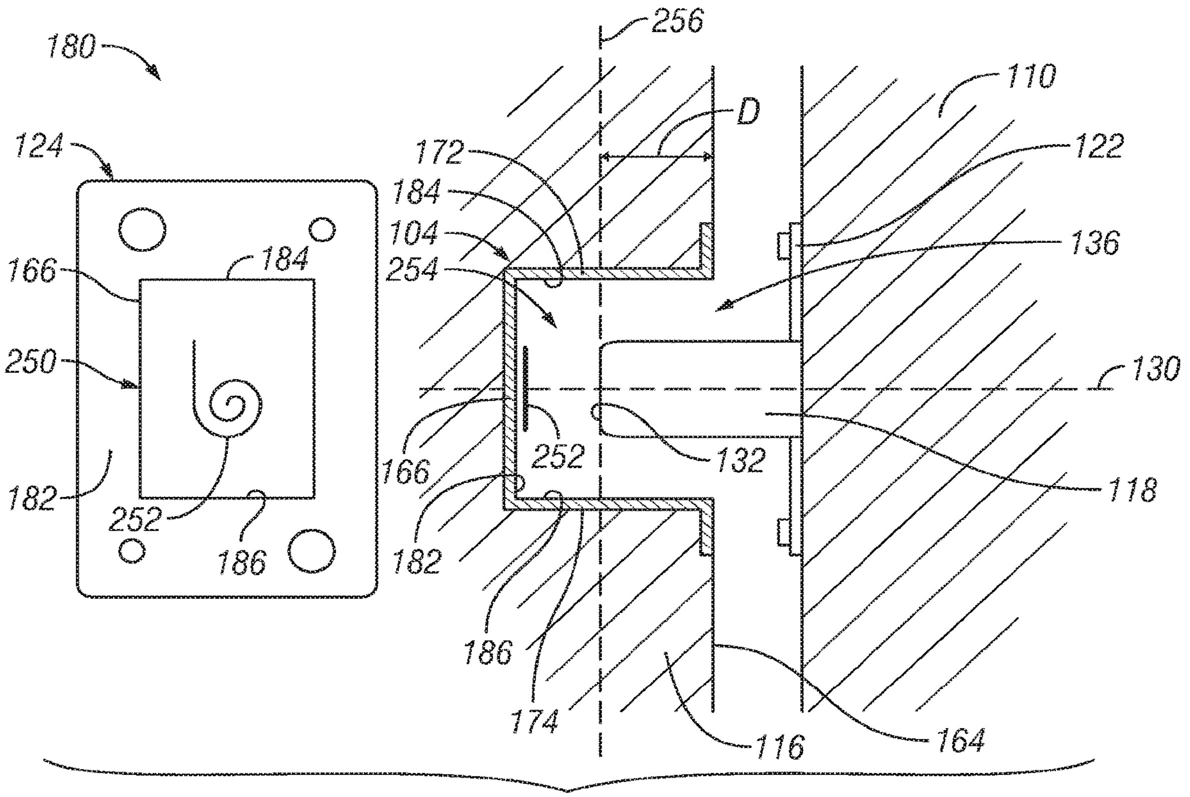

In a tenth illustrative embodiment of the sensor assembly 180, an inductive sensor 250 may be located along an inside surface 182 of the back panel 166 of the strike box 124, as illustrated in FIG. 10. The inductive sensor 250 includes one or more inductive coil elements 252 that are configured to emit an electrical field 254 within the opening 136 of the strike box 124. The sensor assembly 180 is configured to detect the frequency in the electrical field 254 generated by the inductive sensor 250. The inductive coil element 252 is located to be substantially aligned with the extension axis 130 of the bolt 118 when the bolt 118 enters the strike box 124. As the first end 132 of the bolt 118 extends within the opening 136, it will replace the dielectric constant of air, which, in turn will change the frequency measured by the inductive sensor 250, as is generally known. The inductive coil element 252 can be configured to create an electrical field 254 that generally extends to an actuation axis 256, the actuation axis 256 generally being perpendicular to the extension axis 130 and extending a predetermined distance D from the surface 164 of the jamb 116 that corresponds with the bolt 118 being secured within the strike box 124. When the bolt 118 is moved within the strike box 124 the predetermined distance D, the electrical field 254 is changed and the inductive sensor 250 can detect the change in frequency. When a pre-determined frequency threshold is reached within the electrical field 254, the sensor assembly 180 will register that the bolt 118 is secured within the strike box 124. If the bolt 118 is not located within the strike box 124 or located within a predetermined distance D to alter the electrical field 254, then the sensor assembly 180 will then indicate that the bolt 118 is not located within the strike box 124, i.e., the door 110 is not completely latched closed.

Figure 11:
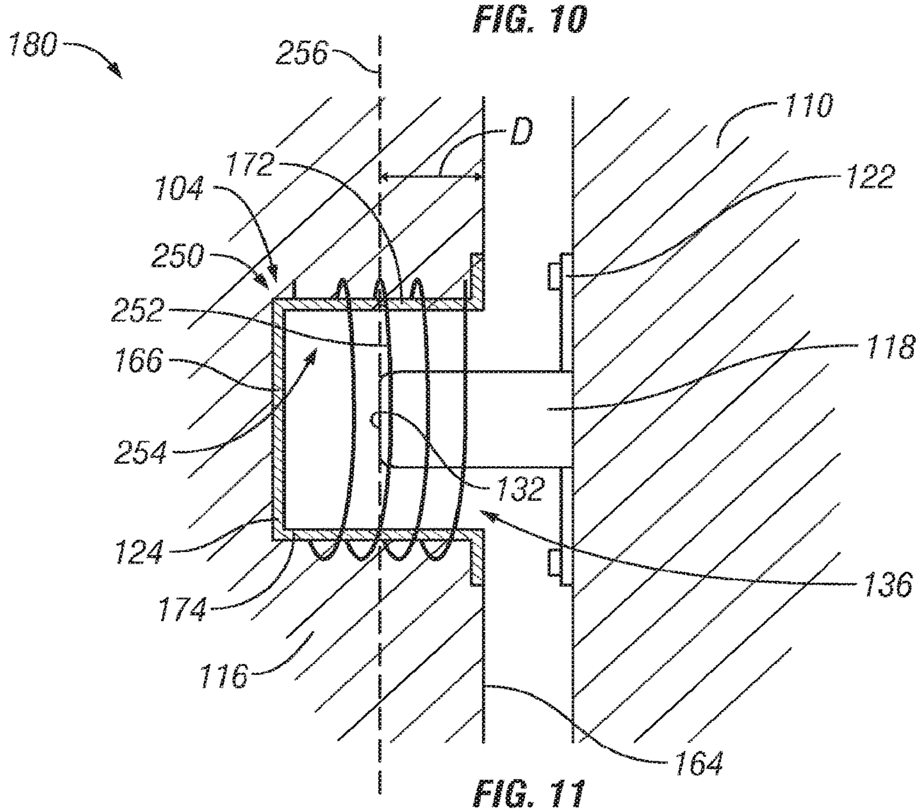

In an eleventh illustrative embodiment of the sensor assembly 180, the sensor assembly 180 may operate in a similar manner as the tenth embodiment, except that the sensor assembly 180 may be positioned around an exterior circumference 190 of the strike box 124, as illustrated in FIG. 11. The exterior circumference 190 of the strike box 124 may be defined by the back panel 166, first side panel 168, second side panel 170, top panel 172, and bottom panel 174. Specifically, the inductive sensor 250 may be configured such that the inductive coil element 252 is wrapped around an outside of the exterior circumference 190 of the strike box 124, or the inductive coil element 252 may be wrapped around an inside of the exterior circumference 190 and contained within the opening 136. The inductive coil element 252 is configured to create the electrical field 254 within the opening 136, and the inductive sensor 250 is configured to measure the frequency of the electrical field 254. As the first end 132 of the bolt 118 extends within the opening 136, the bolt 118 will replace the dielectric constant of air, which, in turn will change the frequency measured by the inductive sensor 250, as is generally known. An actuation axis 256 is perpendicular to the extension axis 130 of the bolt 118 and is defined by being a predetermined distance D from the surface 164 of the jamb 116 that corresponds with the bolt 118 being secured within the strike box 124. When the bolt 118 is moved within the strike box 124 the predetermined distance D, the inductive sensor 250 registers the change in frequency in the electrical field 254, the predetermined distance D corresponding with a when a pre-determined frequency threshold. If the pre-determined frequency threshold is reached within the electrical field 254, the sensor assembly 180 will register that the bolt 118 is secured within the strike box 124. Otherwise, the sensor assembly 180 will register that the door is not securely latched (e.g. closed).

Figure 11A:
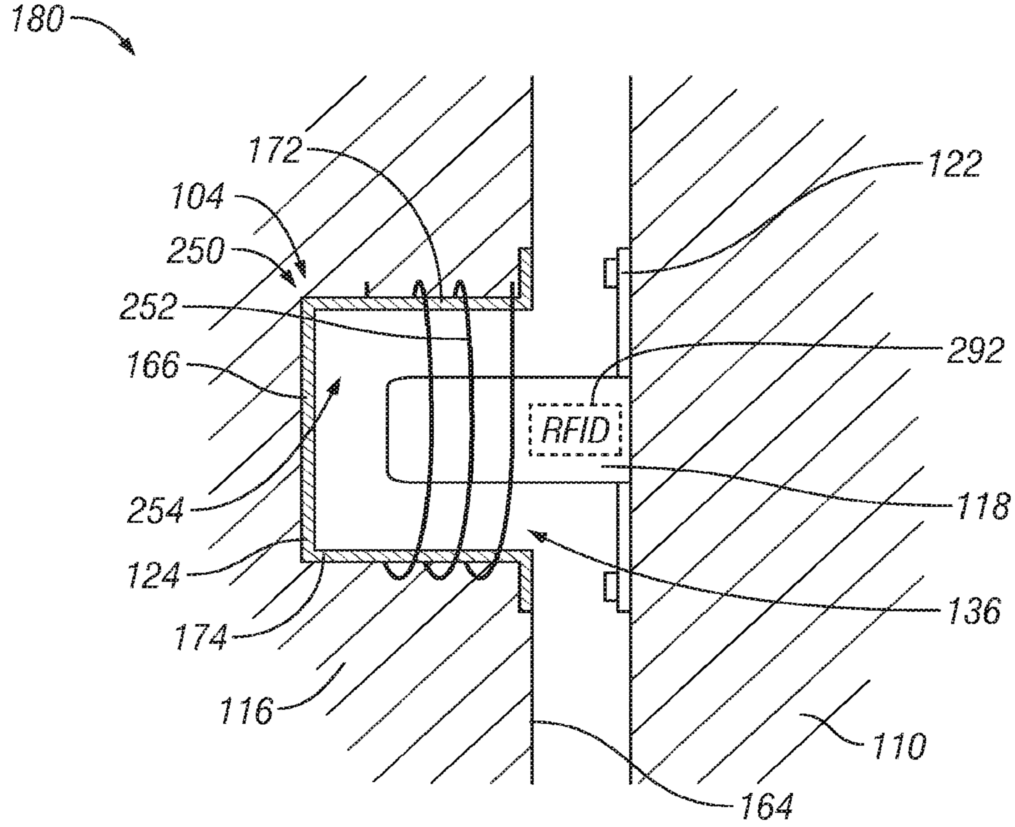

As an alternative embodiment to the eleventh embodiment described above, the boll 118 may include an optional RFID chip 292 that is in communication with the inductive sensor 250. The RFID chip 292 within the bolt 118 may be configured to be activated when the bolt 118 reaches a predetermined distance within the electrical field 254 created by the inductive coil element 252, as illustrated in FIG. 11A. When the bolt 118 is moved within the strike box 124 a predetermined distance that actuates the permits the electrical field 254 to actuate the RFID chip 292, and the RFID chip 292 will send a signal to the inductive sensor 250 that registers the bolt is securely retained within the strike box 124.

Figure 12:
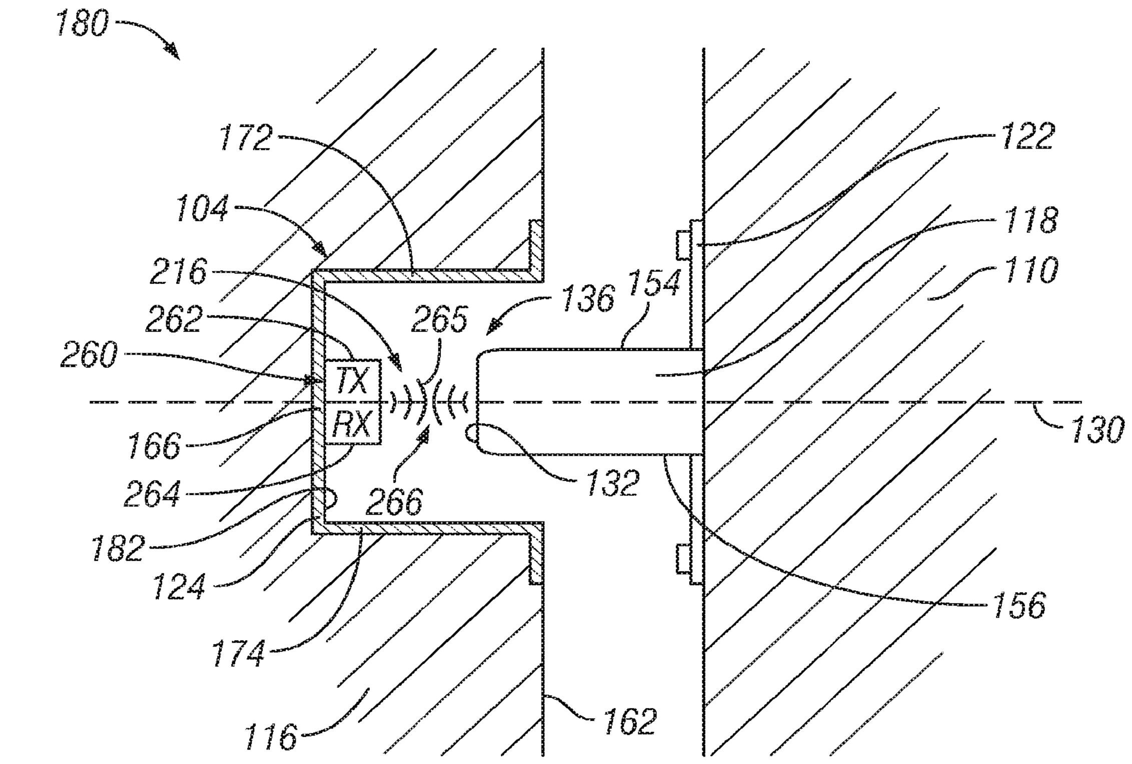

In a twelfth illustrative embodiment of the sensor assembly 180, an ultrasonic sensor 260 may be located along an inside surface 182 of the back panel 166 of the strike box 124, as illustrated in FIG. 12. The ultrasonic sensor 260 includes a transmission (TX) portion 262 and a receiver (RX) portion 264, with the TX portion 212 configured to transmit or send an ultrasonic signal 265 in a transmission field 266 that substantially intersects with the extension axis 130 of the bolt 118. The transmission field 266 is configured to permit the ultrasonic signal 265 to interact with a portion of the first end 132 of the bolt 118 when the bolt 118 enters the strike box 124. The signal 265 is configured to be reflected off of the first end 132 of the bolt 118 when the bolt 118 is received within the strike box 124 such that the signal 265 will reflect off of the bolt 118 and back toward the back panel 166 of the strike box 124 through the transmission field 266. In such an embodiment, the RX portion 264 is configured to be aligned with the transmission field 266 to receive the signal 265 after it has bounced off of the first end 132 of the bolt 118. The RX portion 264 of the ultrasonic sensor 260 is configured to detect the strength of the reflection of the signal 265 after it has bounced off of the first end 132. When the bolt 118 is located at a predetermined distance from the sensor 260 that corresponds with the boll 118 being secured within the strike box 124, the signal 265 will have a determinable reflection strength. The sensor assembly 180 can accordingly detect when the bolt 118 is located within the strike box 124 by analyzing the reflection strength of the signal 265 via the RX portion 214 of the sensor 260. If the bolt 118 is not located within the strike box 124 or located within a predetermined distance of the TX portion 262 that the bolt 118 can receive/deflect the signal 265, then the signal 265 will not be returned to the RX portion 264 and the sensor assembly 180 will then indicate that the bolt 118 is not located within the strike box 124, i.e., the door 110 is not completely latched closed.

Figure 13:
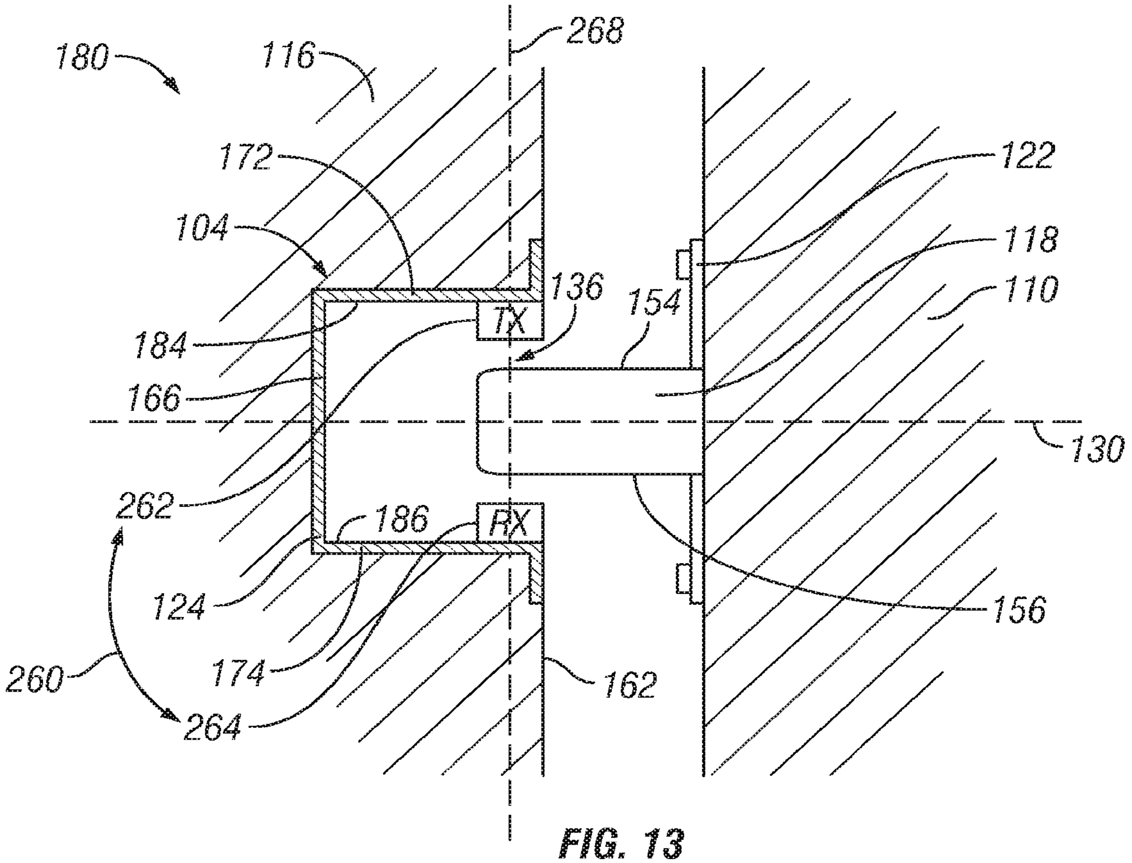

In a thirteenth illustrative embodiment of the sensor assembly 180, an ultrasonic sensor 260 may be located along both an inside surface 184 of the top panel 172 and an inside surface 186 of the bottom panel 174 of the strike box 124, as illustrated in FIG. 13. The ultrasonic sensor 260 includes a transmission (TX) portion 262 and a receiver (RX) portion 264, with the TX portion 262 configured to transmit or send an ultrasonic signal 265 along a beam axis 268 that intersects the RX portion 264. The TX portion 262 may be configured to transmit the ultrasonic signal 265 continuously, or a predetermined time intervals, to the RX portion 264, and the RX portion 264 is configured to detect a signal 265 from the TX portion 262 when there are no interruptions along the beam axis 268. As illustrated in FIG. 13, the beam axis 268 may be substantially perpendicular to the extension axis 130 of the bolt 118, although other alignments of the beam axis 268 and the extension axis 130 are envisioned herein. The beam axis 268 is configured to be at least a predetermined distance D from the surface 164 of the jamb 116, wherein the distance D can represent the amount of distance that the bolt 118 must travel past the surface 164 and into the opening 136 of the strike box 124 to be securely retained within the strike box 124. As the bolt 118 is received within the strike box 124, the top surface 154 and/or the bottom surface 156 of the bolt 118 will intersect the beam axis 268, breaking the signal 265 from the TX portion 262 to the RX portion 264. Accordingly, when the RX portion 264 of the ultrasonic sensor 260 fails to detect the signal 265, the sensor assembly 180 can identify that the bolt 118 is located within the strike box 124, i.e., the door is latched closed. Otherwise, the sensor assembly 180 detects that the door is not fully latched closed.

Figure 14:
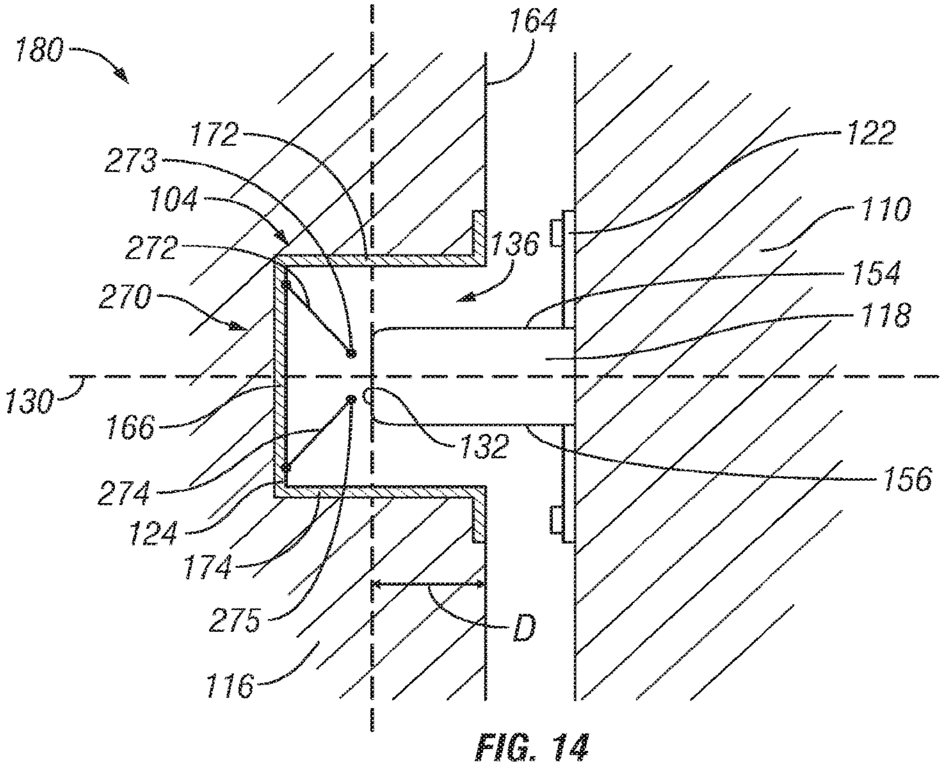

In a fourteenth illustrative embodiment of the sensor assembly 180, a continuity sensor 270 may be located along an inside surface 182 of the back panel 166 of the strike box 124, as illustrated in FIG. 14. The continuity sensor 270 may be comprised of a first leaf spring 272 and a second leaf spring 274, which each of the leaf springs 272 and 274 having a normal state (biased open or biased closed). The continuity sensor 270 is mounted upon the back panel 166 in such a way that the leaf springs 272 can extend within the opening 136 such that a portion (such as ends 273 and 275) of the leaf springs 272 and 274, the leaf springs being aligned to be engaged by the bolt 118 (e.g. the first end 132 of the bolt 118) when the bolt 118 extends a predetermined distance D within the strike plate 124 and the leaf springs 272 and 274 are in their normal state. As the bolt reaches the first and/or second leaf springs 272 and/or 274, the normal stage of the leaf springs 272 and 274 will be changed. The continuity sensor 270 is configured to detect a change in the state of the leaf springs 272 and 274, and will register that the bolt has entered the strike box 124. In various embodiments, the predetermined distance D is the distance between the first edge 132 of the bolt 118 and the surface 164 of the jamb 116 when the bolt 118 is securely retained within the strike box 124. Accordingly, the continuity sensor 270 can indicate that the door is securely closed if the continuity sensor 270 is configured such that the leaf springs 272 and 274 cannot be changed out of their normal state unless the bolt 118 has reached or exceeded the predetermined distance D.

Figure 15:
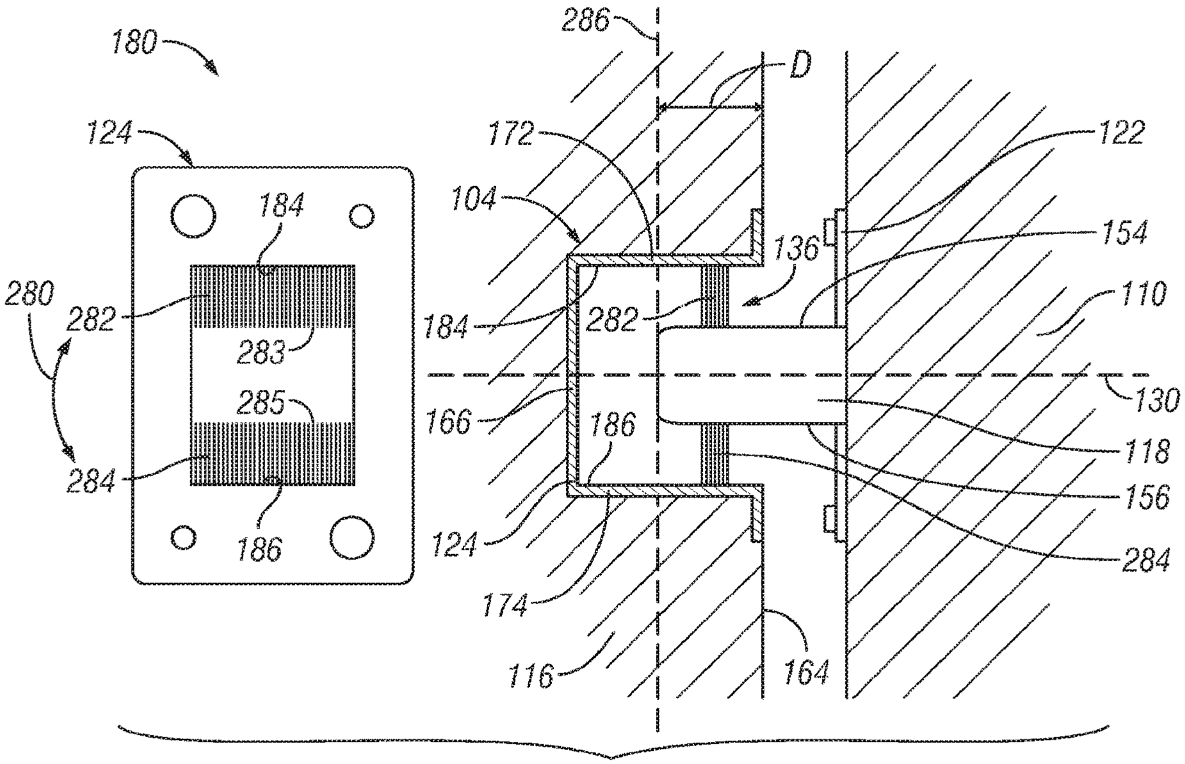

In a fifteenth illustrative embodiment of the sensor assembly 180, a continuity sensor 280 may be located along both an inside surface 184 of the top panel 172 and an inside surface 186 of the bottom panel 174 of the strike box 124, as illustrated in FIG. 15. The continuity sensor 280 may be comprised of a first moveable feature 282 and a second movable feature 284. In various embodiments, the moveable features 282 and 284 are any components that can be moved by a bolt 118 when a bolt 118 comes into contact with the features 282 and 284, and that such movement is capable of being detected by a sensor mechanism. For instance, the moveable features 282 and 284 may be comprised of brushes that extend into the opening 136 from the top panel 172 and bottom panel 174, the brushes having free ends 283 and 285, respectively, that may abut against the top surface 154 and bottom surface 156 of the bolt 118 and be deflected where such deflection can be sensed by the a sensor. Alternatively, each of the movable features 282 and 284 may be comprised of one or more leave springs biased into the opening 136 with free ends 283 and 285. The ends 283 and 285 extend at least a distance X into the opening 136 such that the ends 283 and 285 will engage with the bolt 118 when the bolt 118 is secured within the strike box 124. Other forms of moveable features are known in the art. As illustrated in FIG. 15, the movable features 282 and 284 are positioned along an actuation axis 286 that may be substantially perpendicular to the extension axis 130 of the bolt 118, although other alignments of the actuation axis 286 and the extension axis 130 are envisioned herein. The actuation axis 286 is configured to be at least a predetermined distance D from the surface 164 of the jamb 116, wherein the distance D can represent the amount of distance that the bolt 118 must travel past the surface 164 and into the opening 136 of the strike box 124 to be securely retained within the strike box 124. When the bolt 118 engages with the movable features 282 and 284 within the opening 136, the normal state of the movable features 282 and 284 will be changed and the sensor assembly 180 will register that the bolt has entered the strike box 124.

Figure 16:
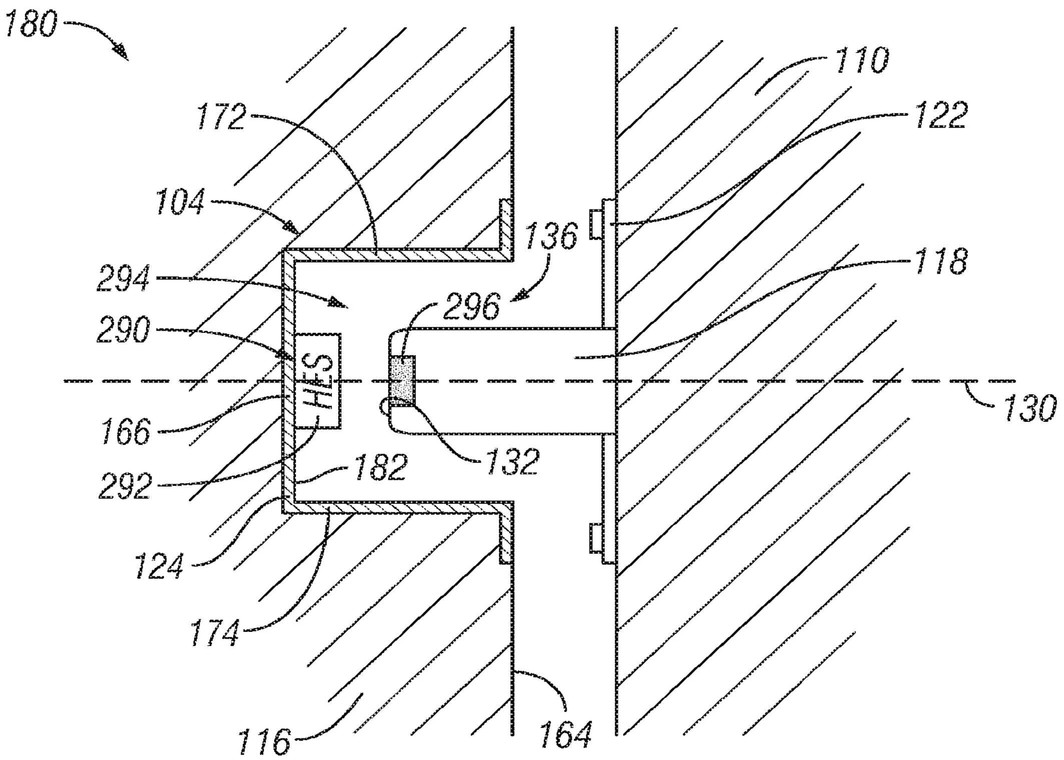

In a sixteenth illustrative embodiment of the sensor assembly 180, a magnet/hall sensor 290 may be located along an inside surface 182 of the back panel 166 of the strike box 124, as illustrated in FIG. 16. The hall sensor 290 includes a hall-effect sensing mechanism 298 that measures the local magnetic field strength of the surrounding area 294 within the opening 136 of the strike box 124. The sensor assembly 180 further includes a magnet or other similar magnet component 296 that is carried by the bolt 118 adjacent the first end 132 of the bolt 118. In illustrative embodiments, the magnet 296 may be located inside the bolt 118. As the bolt 118 travels into the opening 136 and the surrounding area 294 around the hall sensor 290, the magnetic field strength is increased. The sensor 290 can be configured with a predetermined threshold magnetic field strength such that, if the threshold is reached, the sensor 290 will register that the bolt 118 is within the strike box 124 a predetermined distance. The predetermined distance can represent the amount of distance that the bolt 118 must travel past the surface 164 and into the opening 136 of the strike box 124 to be securely retained within the strike box 124. When the hall sensor 290 registers this predetermined distance, the sensor assembly 180 will register that the bolt has entered and is retained within the strike box 124. The amount of predetermined magnetic flux can optionally be calibrated during set-up to account for different door preparation and system configurations.

Figure 17:
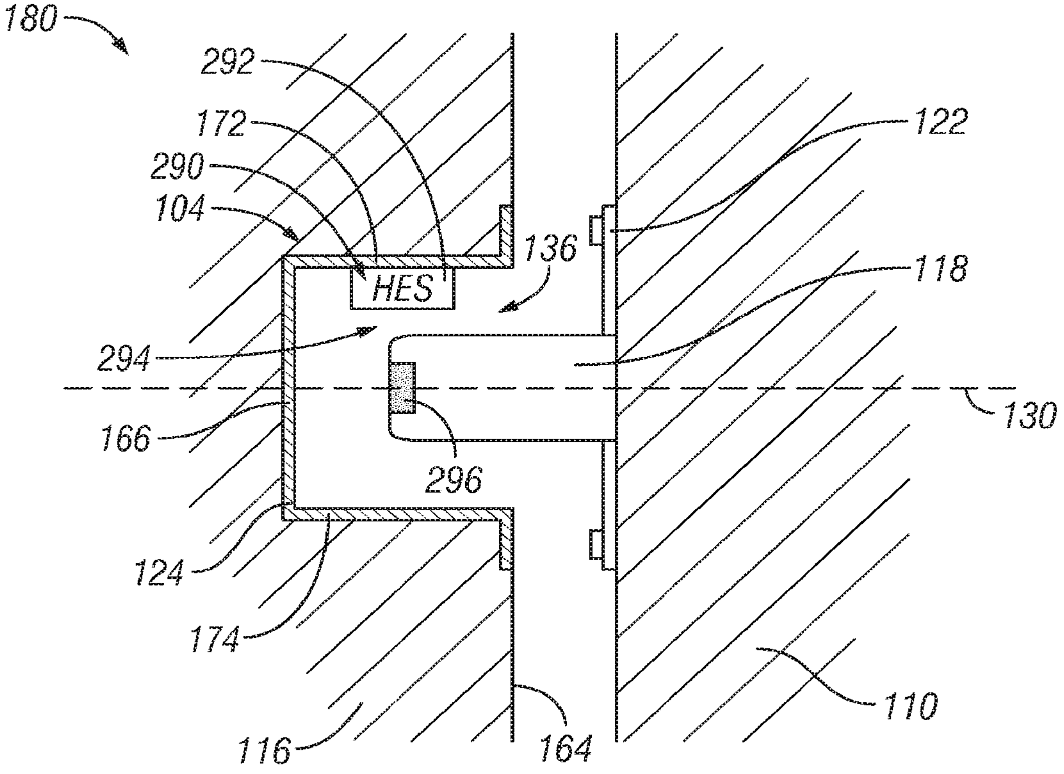

In a seventeenth illustrative embodiment of the sensor assembly 180, the sensor assembly 180 may operate in a similar manner as the sixteenth embodiment, except that the sensor assembly 180 may be located along an inside surface 184 of the top panel 172, as illustrated in FIG. 17. The magnet or other similar magnet component 296 that is carried by the bolt 118 may be positioned adjacent the first end 132 of the bolt 118 or adjacent the top surface 154 of the bolt 118. In illustrative embodiments, the magnet 296 may be located inside the bolt 118. As with the previous embodiment, the sensor assembly 180 includes a hall-effect sensor 290 that can detect and determine the strength of a magnetic field in a surrounding area 294. Accordingly, the sensor assembly 180 can register if the bolt has entered the strike box 124, and further if the bolt has traveled far enough into the strike box 124 to be securely retained within the strike box 124.

A method of using the sensor assembly 180 will now be described. The sensor assembly 180 is coupled to or incorporated in a latch assembly 100 to determine whether a bolt assembly 102 of the latch assembly 100 is engaged with a strike assembly 104 of the latch assembly, and in particular, whether a bolt 118 of the bolt assembly 102 is securely retained within a strike box 124 of the strike assembly 104. The bolt 118 may be positioned, in a first instance, outside of the strike box 124 such that a door 110 in which the bolt assembly 102 is retained is not securely latched. The sensor assembly 180 is at least partially coupled to or retained by the strike assembly 104 and operates to sense whether an interior cavity or opening 136 of the strike box 124 configured to receive the bolt 118 has an object (such as the bolt 118) retained therein. The sensor assembly 180 detects whether the bolt 118 is positioned within the strike box 124 by including at least one sensor retained by the strike box 124. In a first step of the method, the bolt 118 is positioned outside of the strike box 124 and the sensor of the sensor assembly 180 detects that the opening 136 of the strike box 124 does not contain the bolt 118. When the bolt 118 is moved into the opening 136 of the strike box 124, the sensor of the strike box 124 detects a change within the opening 136 and indicates that the bolt 118 has been positioned therein. In various embodiments, the sensor of the strike box 124 can detect how far away an end surface 132 of the bolt 118 is positioned from a back panel 166 of the strike box 124, and accordingly can detect whether the end surface 132 of the bolt 118 is adequately within the strike box 124 such that it is retained therein and will not exit the strike box 124 if a force is applied to the door 110 to which the bolt 118 is attached to disengage the door from its door jamb 116.

Examples

Example 1 provides a sensor assembly for a lock assembly of a door. The sensor assembly includes a sensor located within an opening formed in a strike box of the lock assembly. The sensor is configured to detect whether a bolt of the lock assembly has entered the opening a sufficient distance so as to prevent removal of the bolt from the opening when an opening force is applied to the door.

In Example 2, the subject matter of Example 1 is further configured such that the sensor is an optical sensor that transmits an optical signal that interacts with the bolt when the bolt is within the opening.

In Example 3, the subject matter of Example 2 is further configured such that the optical sensor includes a transmission portion and a receiver portion.

In Example 4, the subject matter of Example 2 is further configured such that the sensor is located along a back panel of the strike box.

In Example 5, the subject matter of Example 4 is further configured such that the bolt is located within the opening, the optical signal is transmitted from the optical sensor, bounces off of an end of the bolt, and is transmitted back to the optical sensor.

In Example 6, the subject matter of Example 2 is further configured such that the sensor is located along a top panel of the strike box.

In Example 7, the subject matter of Example 1 is further configured such that the sensor assembly includes two or more optical sensors.

In Example 8, the subject matter of Example 1 is further configured such that the optical sensor transmits the optical signal along a transmission axis that is parallel to an extension axis upon which the bolt extends within the opening.

In Example 9, the subject matter of Example 1 is further configured such that the sensor is a mechanical sensor.

In Example 10, the subject matter of Example 9 is further configured such that the mechanical sensor comprises a moveable switch that is biased to an open position by a biasing member.

In Example 11, the subject matter of Example 10 is further configured such that the mechanical sensor is positioned along a back panel of the strike box, and wherein the moveable switch extends toward an opening of the strike box in the open position.

In Example 12, the subject matter of Example 11 is further configured such that the movable switch is positioned in the path of movement of the bolt as the bolt is moved along an extension axis into the opening such that the moveable switch is capable of being engaged by an end of the bolt.

In Example 13, the subject matter of Example 9 is further configured such that the mechanical sensor is positioned along a top pane of the strike box.

In Example 14, the subject matter of Example 1 is further configured such that the sensor is a capacitive sensor that emits an electrical field within the opening.

In Example 15, the subject matter of Example 14 is further configured such that the capacitive sensor includes a sensor element that detects changes in the electrical field.

In Example 16, the subject matter of Example 14 is further configured such that the electrical field extends at least to an actuation axis, the actuation axis defined by being a predetermined distance into the opening of the strike box from an aperture providing access to the opening.

In Example 17, the subject matter of Example 14 is further configured such that the sensor is located along a back panel of the strike box.

In Example 18, the subject matter of Example 14 is further configured such that the sensor is located along a side panel of the strike box.

In Example 19, the subject matter of Example 18 is further configured such that the sensor element includes a plurality of sensing elements that detect changes in the electrical field, the plurality of sensing elements positioned in a linear arrangement that is substantially parallel with an extension axis of the bolt as it extends within the opening.

In Example 20, the subject matter of Example 1 is further configured such that the sensor is an inductive sensor.

In Example 21, the subject matter of Example 20 is further configured such that the inductive sensor is located along a back panel of the strike box.

In Example 22, the subject matter of Example 1 is further configured such that the inductive sensor is located along an exterior circumference of the strike box.

In Example 23, the subject matter of Example 20 is further configured such that the sensor includes one or more inductive coil elements that emit an electrical field within the opening, the sensor configured to detect the frequency of the electrical field.

In Example 24, the subject matter of Example 23 is further configured such that the bolt is configured to change the dielectric constant of air within the opening.

In Example 25, the subject matter of Example 24 is further configured such that the dialectical constant of air within the opening will reach a predetermined level when the bolt is located the predetermined distance within the strike box.

In Example 26, the subject matter of Example 25 is further configured such that the predetermined distance corresponds with an actuation axis of the bolt, and the electrical field extends to at least the actuation axis.

In Example 27, the subject matter of Example 27 is further configured such that the sensor is an ultrasonic sensor.

In Example 28, the subject matter of Example 27 is further configured such that the sensor includes a transmission portion and a receiver portion.

In Example 29, the subject matter of Example 28 is further configured such that the transmission portion transmits an ultrasonic signal into a transmission field within the opening.

In Example 30, the subject matter of Example 29 is further configured such that the transmission field extends to at least an actuation axis of the bolt, wherein the actuation axis of located at the predetermined distance within the strike box.

In Example 31, the subject matter of Example 29 is further configured such that the sensor is located along a back panel of the strike box.

In Example 32, the subject matter of Example 31 is further configured such that the ultrasonic signal is transmitted along a transmission axis, the transmission axis being substantially parallel to an extension axis of the bolt.

In Example 33, the subject matter of Example 27 is further configured such that the sensor is located along top and bottom panels of the strike box.

In Example 34, the subject matter of Example 1 is further configured such that the sensor is a continuity sensor.

In Example 35, the subject matter of Example 34 is further configured such that the sensor includes a plurality of moveable features that extend from either a back panel, top panel, or bottom panel of the strike box into the opening.

In Example 36, the subject matter of Example 35 is further configured such that the plurality of moveable features include a free end that may be abutted by the bolt when the bolt is inserted into the opening.

In Example 37, the subject matter of Example 35 is further configured such that the plurality of moveable features are comprised of brushes.

In Example 38, the subject matter of Example 34 is further configured such that the sensor is comprises of one or more leaf springs.

Example 39 provides a lock assembly for a door with a latch assembly coupled to the door and including an extendable bolt. The lock assembly includes a strike assembly coupled to a jamb corresponding to the door. The strike assembly is configured to receive the bolt of the bolt assembly to secure the door to the jamb. A sensor assembly includes a sensor located within an opening formed in a strike box of the strike assembly. The sensor is configured to detect whether the bolt of the bolt assembly is encompassed by the strike box. The sensor assembly is configured to interact with a surface of the bolt when the bolt is located within the opening.

What is claimed is:

1. A lock assembly comprising:

a bolt assembly including a bolt configured to extend and retract linearly along an extension axis, wherein the bolt has a dielectric constant different than air;

a strike assembly including a strike box formed with an opening and space configured to receive at least a portion of the bolt when the bolt is extended linearly along the extension axis, wherein the space within the strike box contains a dielectric constant of air, wherein the strike box includes a first side panel, a second side panel, a top panel, and a bottom panel that are parallel with the extension axis and a back panel that is orthogonal to the extension axis, and wherein the strike box defines a length, parallel with the extension axis, between the opening and the back panel; and a sensor assembly configured to detect whether the at least a portion of the bolt is located within the space of the strike box a predetermined distance from the opening such that the bolt assembly is securely latched within the strike assembly in a closed position, the sensor assembly including:

a capacitive sensor disposed within the strike box and configured to detect an increase in capacitance when at least a portion of the bolt is received within the space of the strike box to determine the closed position, wherein the capacitive sensor includes a plurality of capacitive sensor elements coupled to one or more of the first side panel, the second side panel, the top panel, or the bottom panel, and wherein the plurality of capacitive sensor elements are spaced along the entire length of the strike box.

2. The lock assembly of claim 1, wherein each of the plurality of capacitive sensor elements are configured to emit an electrical field.

3. The lock assembly of claim 2, wherein the electrical field extends along a measurement plane defined within the strike box that corresponds to the bolt extending to the corresponding capacitive sensor element of the plurality of capacitive sensor elements.

4. The lock assembly of claim 3, wherein the measurement plane is orthogonal to the extension axis when the bolt enters the strike box.

5. The lock assembly of claim 3, wherein the strike assembly includes a base plate coupled to the strike box and defining the opening, and wherein at least one of the measurement planes is positioned at the predetermined distance from the base plate.

6. The lock assembly of claim 2, wherein the plurality of capacitive sensor elements are positioned on an inside surface of the one or more of the first side panel, the second side panel, the top panel, and the bottom panel.

7. The lock assembly of claim 2, further comprising an exterior assembly and an interior assembly, the interior and exterior assemblies operationally coupled to the bolt assembly.

8. The lock assembly of claim 7, wherein the interior and exterior assemblies are configured to mechanically or electronically operate the bolt assembly.

9. The lock assembly of claim 2, wherein the bolt assembly is mounted to a door and the strike assembly is mounted to a door jamb.

10. A method of determining a closed position of a bolt assembly relative to a strike assembly, the method comprising:

extending a bolt from the bolt assembly linearly along an extension axis towards the strike assembly, wherein the bolt has a dielectric constant different than air;

at least partially receiving the bolt within an opening and space formed by a strike box of the strike assembly, wherein the space within the strike box contains a dielectric constant of air, wherein the strike box includes a first side panel, a second side panel, a top panel, and a bottom panel that are parallel with the extension axis and a back panel that is orthogonal to the extension axis, and wherein the strike box defines a length, parallel with the extension axis, between the opening and the back panel;

detecting, by a sensor assembly having a capacitive sensor disposed within the strike box, a change in capacitance upon receipt of the bolt, at least partially, within the space of the strike box, wherein the capacitive sensor includes a plurality of capacitive sensor elements coupled to one or more of the first side panel, the second side panel, the top panel, or the bottom panel, and wherein the plurality of capacitive sensor elements are spaced along the entire length of the strike box; and determining, based on the detected change in capacitance, whether the bolt is at least partially located within the space of the strike box a predetermined distance from the opening, wherein only when the bolt extends the predetermined distance from the opening within the space of the strike box, the bolt is in the closed position relative to the strike assembly.

11. The method of claim 10, further comprising emitting by each of the plurality of capacitive sensor elements of the capacitive sensor, an electrical field within the space of the strike box.

12. The method of claim 11, wherein each electrical field extends along a measurement plane within the strike box, such that at least one of the electrical fields corresponds to the predetermined distance that the bolt must reach to define the closed position.

13. The method of claim 10, wherein determining whether the bolt is located, at least partially, within the space of the strike box the predetermined distance from the opening includes comparing the detected capacitance to a predetermined capacitive threshold.

14. The method of claim 10, wherein determining whether the bolt is located, at least partially, within the space of the strike box the predetermined distance from the opening includes evaluating saturation across the plurality of capacitive sensor elements of the capacitive sensor.

15. The method of claim 10, wherein determining whether the bolt is located, at least partially, within the space of the strike box the predetermined distance from the opening includes evaluating a pre-determined order of saturation of the plurality of capacitive sensor elements of the capacitive sensor.

* * * * *